US010592945B2

(12) United States Patent
Roycroft et al.

(10) Patent No.: US 10,592,945 B2
(45) Date of Patent: Mar. 17, 2020

(54) SYSTEM AND METHOD FOR ENHANCING ALCOHOLIC BEVERAGE TRANSACTIONS AND THE PORTIONING OF RELATED PRODUCTS BETWEEN MERCHANT AND CONSUMER

(71) Applicants: Daniel P. Roycroft, East Aurora, NY (US); Scott M. Steffan, Hamburg, NY (US)

(72) Inventors: Daniel P. Roycroft, East Aurora, NY (US); Scott M. Steffan, Hamburg, NY (US)

( * ) Notice: Subject to any disclaimer, the term of this patent is extended or adjusted under 35 U.S.C. 154(b) by 327 days.

(21) Appl. No.: 15/489,334

(22) Filed: Apr. 17, 2017

(65) Prior Publication Data

US 2017/0300983 A1 Oct. 19, 2017

Related U.S. Application Data

(60) Provisional application No. 62/323,593, filed on Apr. 15, 2016.

(51) Int. Cl.
*G06Q 30/06* (2012.01)
(52) U.S. Cl.
CPC ............... *G06Q 30/0601* (2013.01)
(58) Field of Classification Search
CPC ................................. G06Q 30/0601
USPC ..................................... 705/26.1
See application file for complete search history.

(56) References Cited

U.S. PATENT DOCUMENTS

| 5,412,560 | A  | * | 5/1995  | Dennison ............ G06F 19/3475 600/300 |
| 6,542,873 | B1 |   | 4/2003  | Goodwin, III et al. |
| 6,980,999 | B1 | * | 12/2005 | Grana .................... G06Q 30/02 600/300 |
| 7,090,638 | B2 | * | 8/2006  | Vidgen ............... G06F 19/3475 600/300 |
| 7,264,156 | B2 |   | 9/2007  | Lealao et al. |
| 8,626,796 | B2 | * | 1/2014  | McBride ............. G06F 19/3475 707/796 |
| 8,631,050 | B1 | * | 1/2014  | Gayle ................... G06F 16/258 707/803 |
| 2004/0093281 | A1 | * | 5/2004 | Silverstein ............. G06Q 20/04 705/26.8 |

(Continued)

*Primary Examiner* — Alexis M Casey
(74) *Attorney, Agent, or Firm* — Vincent G. LoTempio; Kloss, Stenger & LoTempio; David T. Stephenson

(57) ABSTRACT

A system and method for enhancing alcoholic beverage transactions and the apportioning of products between a merchant and a consumer provides a platform for a merchant to offer a listing of alcoholic beverages, events, and promotions related to alcoholic beverages. A consumer also has a platform from which to view the listings, find a merchant or type of alcoholic beverage in a geographical area, transact immediate purchases, and reserve purchases of select alcoholic beverages. A reserved sale of the alcoholic beverage allows merchant to guarantee a sale of the alcoholic beverage, and also allows the alcoholic beverage to be decanted for an optimal duration before consumer consumes the alcoholic beverage. Consumer also benefits, knowing the alcoholic beverage is available, and at a known price. Consumer information, favorite selections, and historical purchases are stored in a consumer database to assist merchant with future marketing and recommendations of alcoholic beverages to consumer.

11 Claims, 5 Drawing Sheets

(56) References Cited

U.S. PATENT DOCUMENTS

| | | | | |
|---|---|---|---|---|
| 2005/0042582 A1* | 2/2005 | Graves | ............... | G09B 19/0092 |
| | | | | 434/127 |
| 2005/0113649 A1* | 5/2005 | Bergantino | ............ | G06Q 50/22 |
| | | | | 600/300 |
| 2006/0263750 A1* | 11/2006 | Gordon | .................. | G06O 99/00 |
| | | | | 434/127 |
| 2007/0192216 A1 | 8/2007 | Arnold et al. | | |
| 2012/0310758 A1* | 12/2012 | Bai | .................... | G06O 30/0633 |
| | | | | 705/23 |

\* cited by examiner

SYSTEM AND METHOD FOR ENHANCING ALCOHOLIC BEVERAGE TRANSACTIONS AND THE PORTIONING OF RELATED PRODUCTS BETWEEN MERCHANT AND CONSUMER

CROSS REFERENCE OF RELATED APPLICATIONS

This application claims the benefits of U.S. provisional application No. 62/323,593, filed Apr. 15, 2016 and entitled MOBILE APPLICATION FOR THE MARKETING AND SALES OF WINE AND RELATED PRODUCTS, which provisional application is incorporated by reference herein in its entirety.

FIELD OF THE INVENTION

The present invention relates generally to a system and method for enhancing alcoholic beverage transactions between a merchant and a consumer. More so, the present invention relates to a system and method that enhances transactions of alcoholic beverages, such as wine, by providing a merchant platform for a merchant to present alcoholic beverages and associated offerings, and a consumer platform for a consumer to view the listings of alcoholic beverages and secure a transaction thereof; whereby the system and method is operable with a software application on a mobile communication device; whereby the merchant may manage account settings, load and update listings of the alcoholic beverages, load and update promotions for the alcoholic beverage both in real time and for the future, load and update events related to the alcoholic beverage, and permit portions of or whole products to be made available for reservations whereby guarantying availability of the portion at a later date, and access a database to view alcoholic beverage data and preferences of a consumer; whereby the consumer may manage account settings, locate a merchant from a plurality of merchants in a geographical area, locate a merchant that provides a promotion or special offering of the alcoholic beverage, store a favorite list of alcoholic beverages, purchase the alcoholic beverage at regular pricing, discount pricing, and a guaranteed price, and reserve a portion of the alcoholic beverage for a future transaction at a guaranteed price; whereby the reserved sale of the alcoholic beverage allows the merchant to guarantee a sale of the whole or a portion of the alcoholic beverage, and also allows the alcoholic beverage to be prepared or decanted for an optimal duration before the consumer arrives to acquire the alcoholic beverage; whereby the favorites selections and historical purchases of the consumer are stored in a database for future marketing and recommendations of the alcoholic beverage by the merchant.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known in the art that wine is an alcoholic beverage made from fermented grapes. These grapes are generally *Vitis vinifera*, or a hybrid with *Vitis labrusca* or *Vitis rupestris*. Grapes are fermented without the addition of sugars, acids, enzymes, water, or other nutrients. Yeast consumes the sugar in the grapes and converts it to ethanol and carbon dioxide. Different varieties of grapes and strains of yeasts produce different styles of wine.

Currently, wine consumption is a market with expected continued expansion over the next decade as wine becomes more popular with consumers. One reason for growth in the wine market is that consumers simply have more access to wine. In particular, the availability to purchase products via the Internet has increased consumer access to wine, including access to many wines not available at a consumer's local brick and mortar store. Also, the variety and quality of wine has increased with a corresponding increase in price.

This has created a situation where there are myriad types of wines, exceeding the numbers of other alcoholic beverages. For example, a consumer at an alcoholic beverage establishment who wishes to order beer or a distilled beverage thus does not have an overwhelming task. A typical beer list or spirit list in a restaurant consists of a relatively small number of well-known brands whose tastes are fairly predictable and stable. In contrast, a typical wine list has a great many entries. Variations in taste, and in price, are large. And to make matters worse, both taste and price vary from year to year in an unpredictable way. For many restaurant patrons, choosing from a wine menu is something of a gamble.

Other proposals have involved transacting wine. The problem with these wine transaction methods that they do not allow the wine merchant to easily list wine offerings, or the consumer to easily access the listed wine offerings. Also, the promotions and events are not always known by the public. Also, this method offers a significant improvement transacting portions of beverages in quantities too large for the desired buyers. In turn, merchants assume lower risk when portioning said beverages via pre-purchased reservations ensuring adequate revenue exists, thereby reducing the potential for loss and ensuring desired profit margins for a merchant are maintained. Even though the above cited wine transaction methods meet some of the needs of the market, a system and method that enhances transactions of alcoholic beverages, such as wine, by providing a merchant platform for a merchant to present alcoholic beverages and associated offerings, and a consumer platform for a consumer to view the listings of alcoholic beverages and secure a transaction thereof is still desired.

SUMMARY

Illustrative embodiments of the disclosure are generally directed to a system and method for enhancing alcoholic beverage transactions between a merchant and a consumer. The system and method enhances transactions of alcoholic beverages by providing a platform for a merchant to offer a listing of alcoholic beverages, events, and promotions related to alcoholic beverages. A consumer is also provided a platform from which to view the listings, find a merchant or a type of alcoholic beverage in a geographical area, transact immediate purchases, and reserve purchases of select or portions of alcoholic beverages. The subsequent alcoholic beverage transaction is easily performed on a downloadable or accessible software application from the convenience of a mobile communication device for each party in the transaction.

In one embodiment, the system and method provides a merchant platform that is operable with a software application on a mobile communication device, or any computing device known in the art. The merchant platform is operable for a merchant to enable listing of alcoholic beverages and associated alcohol related offerings, including events, promotions, and reservations of alcoholic beverages.

Further, the merchant may manage account settings, load and update listings of the alcoholic beverages, load and update promotions for the alcoholic beverage both in real time and for the future, load and update events related to the alcoholic beverage, make available portions of or the whole alcoholic beverage for a reservation and guaranteed transaction, and access a consumer database to better understand a consumer's alcoholic beverage preferences and related data.

Similarly, the system and method provides a consumer platform that is operable with the software application on a mobile communication device, or any computing device known in the art. The consumer platform allows the consumer easy access to view the merchant's listings of alcoholic beverages, input personal information and favorite alcoholic beverages, reserve alcoholic beverages, or a portions of, and secure the transaction thereof.

Through the consumer platform, the consumer may manage account settings, locate a merchant from a plurality of merchants in a geographical area, locate a merchant that provides a promotion or special offering of the alcoholic beverage, store a favorite list of alcoholic beverages in the consumer database, purchase the alcoholic beverage at regular pricing, discount pricing, or guaranteed price, and reserve the alcoholic beverage, or portions of at a guaranteed price.

In some embodiments, the reserved sale of the alcoholic beverage, or a portion, allows the merchant to guarantee a sale of the alcoholic beverage, and also allows the alcoholic beverage to be decanted or prepared for an optimal duration before the consumer arrives to acquire the alcoholic beverage. This also allows the merchant high flexibility in the quantity and size of portions, and eliminates the risk of unsold portions and/or spoiling. The consumer also benefits, knowing the alcoholic beverage will be available, and at a known price. Further, the favorite selections and historical purchases of the consumer are stored in a consumer database to assist the merchant with future marketing and recommendations of alcoholic beverages to the consumer.

In one aspect, a method for enhancing alcoholic beverage transactions between a merchant and a consumer, comprises:
providing a merchant platform, the merchant platform accessible by a merchant for operation of the method;
offering, by the merchant, a listing of alcoholic beverages through the merchant platform;
offering, by the merchant, a promotion for at least one of the listing of alcoholic beverages;
offering, by the merchant, a guaranteed price for at least one of the listing of alcoholic beverages, whereby the guaranteed price is dependent on reserving a portion of or a whole unit of at least one of the listing of alcoholic beverages;
listing, by the merchant, an event related to the alcoholic beverages;
providing a consumer platform, the consumer platform accessible by a consumer for operation of the method;
inputting, by the consumer, consumer information into the consumer platform;
storing the consumer information in a consumer database;
searching, by the consumer, for the merchant, or the listing of alcoholic beverages, or both through the consumer platform;
viewing the listing of alcoholic beverages offered by the merchant;
purchasing a portion of or a whole unit of the listing of alcoholic beverages from the merchant;
reserving, by the consumer, a portion of or a whole unit of the listing of alcoholic beverages for the guaranteed price;
locating, by the consumer, the merchant in a geographical area with an indicator; and
reviewing, by the merchant, the consumer information stored in the consumer database.

In another aspect, the alcoholic beverages include at least one of the following: wine, beer, liquor, champagne, spirits, tequila, rum, and specialty cocktail drinks.

In another aspect, the merchant comprises a restaurant, a liquor store, or a winery.

In another aspect, the merchant platform is operable on a software application that downloads or is accessed on a merchant mobile communication device.

In another aspect, the method comprises an indicator, the indicator operable to indicate a location of the merchant, or a type of the listing of alcoholic beverages, or both.

In another aspect, the guaranteed price is for a portion, usually a glass of wine.

In another aspect, the event related to the alcoholic beverages is a wine tasting or food paring event.

In another aspect, the consumer platform is operable on the software application that downloads or is accessed on a consumer mobile communication device.

In another aspect, the at least one geographical listing is accessible from the consumer platform.

In another aspect, the consumer information includes at least one of the following: a name, an alcoholic beverage preference, a purchase history, and a birthdate.

In another aspect, the indicator is operable to identify between the types of merchants and the listings of alcoholic beverages.

In another aspect, the indicator is a colored pin or indicator visible on the geographical area.

In another aspect, the method further comprises a step of updating settings for the merchant through the merchant platform.

In another aspect, the method further comprises a step of updating settings for the consumer through the consumer platform.

One objective of the present invention is to efficiently connect a merchant offering of alcoholic beverages with a consumer through a software application accessible through mobile communication devices.

Another objective is to enable the alcohol merchant to globally offer a plurality of alcoholic beverages on a network.

Yet another objective is to provide a robust, real time listing of alcoholic beverages.

Yet another objective is to provide alcoholic beverage events visible to consumers.

Yet another objective is to provide a guaranteed price when the consumer reserves a portion of or the whole unit of an alcoholic beverage, so that the acquisition of the alcoholic beverage is at the apportioned quantity in the future.

Yet another objective is to provide the merchant with guaranteed revenue with the reserve sales.

Yet another objective is to decant wine or prepare the product prior to the consumer arriving at a restaurant through the reserved wine.

Yet another objective is to provide regular promotions for consumers to check on regularly.

Yet another objective is to provide a map on the consumer platform so that the consumer can find merchants having a desired alcoholic beverage.

Yet another objective is to provide a consumer database that stores consumer information, such as alcoholic beverage preferences, personal contact data, and historical purchases.

Yet another objective is to provide an easy to use software application that is downloadable or accessible on a mobile communication device, and allows for smooth transactions of alcoholic beverages.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
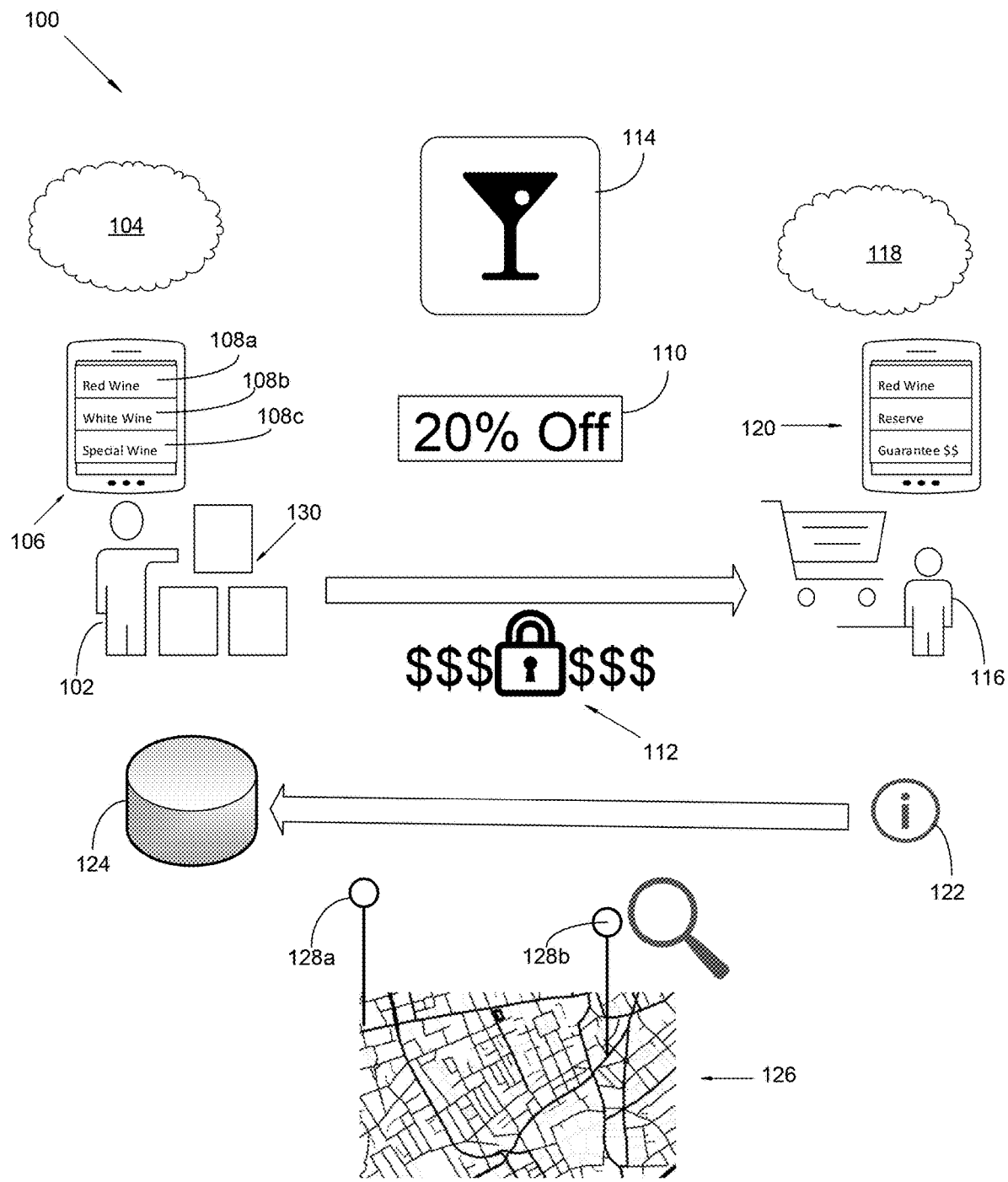
FIG. 1 illustrates a block diagram view of an exemplary system for enhancing alcoholic beverage transactions between a merchant and a consumer, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A system 100 and method 200 for enhancing alcoholic beverage transactions between a merchant and a consumer is referenced in FIGS. 1-4. System 100 enhances transactions of alcoholic beverages 130 by providing a merchant platform 104, through which the merchant 130 can easily offer a listing 108a-c of alcoholic beverages, reserve alcoholic beverages 130 for a consumer 116, schedule events 114, advertise promotions 110, and access a consumer database 124 having stored therein, a consumer information 122.

System 100 also provides a consumer 116 with a consumer platform 118 to view the listings 108a-c of alcoholic beverages from merchant 130, find a merchant 130 in a geographical area 126, transact immediate purchases, reserve purchases of portions of or whole units of select alcoholic beverages, and input consumer information 122 for storage in the consumer database 124. The subsequent alcoholic beverage transaction is easily performed on a downloadable or accessible software application from the convenience of a mobile communication device 106, 120 for each party in the transaction.

In some embodiments, the alcoholic beverage 130 may include, without limitation, wine, beer, liquor, champagne, spirits, tequila, rum, and specialty cocktail drinks. Alcoholic beverage 130 may be stored and dispensed from a vessel, such as a glass of wine, or a special type of wine in a wine bottle, beer bottle, shot glass, or wine decanter.

Furthermore, in addition to alcoholic beverages 130, system 100 enables transactions for fungible items. Fungible items may include, without limitation, water, fruit drinks, cigars, any aggregation of items packaged in such a manner that division of said items is possible for consumption or use by individuals or groups, bulk packed consumer goods, toothpaste, deodorant, personal products, any batch prepared food (e.g. tray of lasagna, sushi roll, cake), and commercial products such as raw materials ingredients.

In some embodiments, merchant 130 may include, without limitation, a restaurant, a liquor store, a winery, a bar, a grocery store, and the fungible items described above. Consumer 116 may include, without limitation, a purchaser of alcoholic beverages or the fungible items described above.

As referenced in FIG. 1, system 100 comprises a merchant 130 who offers a listing 108a-c of alcoholic beverages for sale. For example, listings 108a-c may include a red wine 108a, a white wine 108b, and a special wine 108c. Merchant 130 may also offer myriad alcoholic beverage related activities, such as an alcoholic beverage related event 114, an alcoholic beverage related promotion 110, and an alcoholic beverage related market study of a consumer 116, through access to a consumer database 124.

In some embodiments, merchant 130 may utilizes a merchant mobile communication device 106 to operate system 100 on a framework of merchant platform 104. Merchant mobile communication device 106 may include a smartphone, or other processing tool known in the art, having downloaded or accessed a software application that hosts the merchant platform 104. Merchant platform 104 is configured to enable the merchant 130 to operate the system 100 on a framework designed from the merchant operational point of view.

In some embodiments, a promotion 110 is offered by merchant 130 to transact the listing 108a-c of portions of or whole units of alcoholic beverages at an advantageous cost. Promotion 110 is offered by the merchant 130 to transact the listing of alcoholic beverages at an advantageous cost to consumer 116, or to attract new consumers 116 to the merchant 130, or to introduce a new type of alcoholic beverage. For example, a 20% discount could be offered for a bottle of wine, or a half-price meal could be offered with the purchase of each glass of wine. Promotion 110 is initiated by merchant 130 through merchant platform 104, and may be offered in real time or for future transactions.

In addition to the promotion 110, an alcoholic beverage event 114 may be produced and scheduled by the merchant 130. Event 114 is especially efficacious for introducing the listing 108a-c of alcoholic beverages to new consumers, and also to help integrate merchant 130 with the community. Event 114 may include alcoholic related events 114, such as wine tasting events, beer brewing classes, and wine and food festivals. Similar to promotion 110, the event 114 is initiated by merchant 130 through merchant platform 104, and may be offered in real time or for future transactions.

Similar to merchant 130, the consumer 116 utilizes a consumer mobile communication device 120 to operate system 100. Consumer mobile communication device 120 may include a smartphone, or other processing tool known in the art, having downloaded or accessed a software application that hosts the consumer platform 118. Consumer platform 118 is configured to enable the consumer 116 to operate the system 100 on a framework designed from the consumer's operational point of view; including communications with merchant 130 for transactions and other alcoholic beverage related offerings.

Looking again at FIG. 1, system 100 provides a graphical geographical area 126 that defines a location of the merchant 130, and specifically multiple merchant 130s having different alcoholic beverages and offerings. Consumer 116 may search geographical area 126 on the consumer mobile communication device 120 to identify a location of a merchant 130 or a desired alcoholic beverage. In one embodiment, geographical area 126 is a graphical depiction of a map that is visible on the consumer mobile communication device 120, such that consumer 116 can best identify location and listings of each merchant 130. This creates, in essence, a virtual marketplace. In one embodiment, geographical area 126 is a street map in a city.

At least one indicator 128a, 128b may be employed with geographical area 126. Indicator is used to identify merchants that appear on the geographical area 126. Indicator 128a, 128b is operable to indicate a location of the merchant 130, or a type of the listing of alcoholic beverages, or both. Indicator 128a, 128b helps consumer 116 differentiate between multiple merchants by their alcoholic beverage listings 108a-c. In one embodiment, indicator 128a-b comprises variously colored pins that differentiate between the different types of merchants, or specified alcoholic beverages. For example, a red pin 128a on the graphical depiction of geographic area 126 indicates a restaurant, while a blue pin 128b indicates a liquor store. In this manner, indicator facilitates consumer's search for a desired merchant and alcoholic beverage.

System 100 also allows consumer 116 to input a consumer information 122 through the consumer platform 118. Consumer information 122 is stored in a consumer database 124, whereby the merchant 130 has access to the consumer database 124 through the merchant platform 104. In one embodiment, consumer information 122 may include, without limitation, a name, an alcoholic beverage preference, a purchase history, and a birthdate. Consumer information 122 is accessible by merchant 130 to develop a marketing strategy.

System 100 also allows a consumer 116 to purchase at least one of the listings 108a-c of alcoholic beverages directly from the consumer platform 118. This may include selecting at least one of a portion of or a whole unit of the listing of alcoholic beverages. Payment is also afforded through payment means known in the art. Consumer 116 works with merchant 130 to perform the transaction for the alcoholic beverages 130. Through purchase procedure, consumer 116 also provides consumer information 122 that merchant 130 can use to better serve and market to consumer 116.

System 100 also allows for consumer 116 to receive a guaranteed price 112 by reserving a portion of or a whole unit of at least one of the listing 108a-c of alcoholic beverages. In one embodiment, consumer 116 reserves a glass of wine. Though any drinking or storage vessel for the alcoholic beverage may be reserved in this manner. Merchant 130 benefits from the reservation arrangement by receiving a guaranteed sale.

Also, since the consumer 116 has reserved the alcoholic beverage by prepaying, the merchant 130 receives a guaranteed sale of the alcoholic beverage. In yet another interesting advantage, since the sale of the alcoholic beverage is guaranteed, the alcoholic beverage can be decanted or prepared for an optimal duration before the consumer 116 arrives to acquire the alcoholic beverage. And of course, the consumer 116 benefits, knowing the alcoholic beverage will be available upon arrival at the merchant 130, and at a known price.

The reserved sale of the alcoholic beverage 130 allows the merchant 130 to guarantee a sale of the alcoholic beverage, and also allows the alcoholic beverage to be decanted or prepared for an optimal duration before the consumer 116 arrives to acquire the alcoholic beverage. Consumer 116 also benefits, knowing the alcoholic beverage will be available, and at a known price. Further, the favorite selections and historical purchases of the consumer 116 are stored in consumer database 124 to assist merchant 130 with future marketing and recommendations of alcoholic beverages to consumer 116.

In some embodiments, system 100 consists of both a mobile application and a website on the Internet, or other network known in the art. Merchant 130 operates on a merchant platform 104, while consumer 116 operates on a consumer platform 118. Both platforms interface and communicate with a consumer database 124 that stores consumer information 122, collecting and transmitting data to and from each of these stakeholders respectively. Thus, system 100 provides a merchant platform 104 that is operable with a software application on a mobile communication device, or any computing device known in the art.

Merchant platform 104 is operable for a merchant 130 to enable the merchant 130 to list a listing of alcoholic beverages and associated alcohol related offerings. Consumer platform 118 allows consumer 116 to operate the system 100 on a framework designed from the consumer's operational point of view; including communications with merchant 130 for transactions and other alcoholic beverage related offerings. Consumer platform 118 allows the consumer 116 easy access to view the merchant's 130 listings of alcoholic beverages and secure a transaction thereof.

Further, an account settings feature on merchant platform 104 allows merchant 130 to manage account settings. This may include, without limitation: loading and updating listings of the alcoholic beverages, loading and updating promotions 110 for the alcoholic beverage both in real time and for the future, loading and updating events 114 related to the alcoholic beverage, reserve the alcoholic beverage for a guaranteed transaction, and access a consumer database 124 to better understand a consumer's alcoholic beverage preferences and related data.

Through the consumer platform 118, the consumer 116 may also manage account settings. These settings may include, without limitation: locating a merchant 130 from a plurality of merchants in a geographical area 126, locating a merchant 130 that provides a promotion 110 or special offering of the alcoholic beverage, storing a favorite list of alcoholic beverages in the consumer database 124, purchase the alcoholic beverage at regular pricing, discount pricing, or guaranteed price 112, and reserving a portion of or the whole unit of the alcoholic beverage at a guaranteed price 112.

System 100 is advantageous in that transactions conducted have an increased cash flow by the apportioning of large quantity beverages into smaller, more affordable portions; reduced risk by utilizing a guaranteed price 112; provides a common platform to list, market; and identifying known merchant offerings at specific locations in the geographic area 126.

System 100 provide additional advantageous for creating a more efficient transaction of alcoholic beverages, and specifically wine. For one, the system 100 provides a consumer platform 118 that makes more merchant wine information available to an unlimited number of users than any other platform available. System 100 also provides the ability to identify merchants that match consumer 116 favorites and wish lists. System 100 also provides the ability to offer and purchase a guaranteed price 112 for a sale of reserved glass of wine.

System 100 also provides the ability to control the level of apportioning of wine (e.g. volume of offering, number of offers available, etc.). System 100 also provides a guaranteed price 112 to consumer 116 prior to opening the bottle of alcoholic beverage, which allows optimum decanting time. System 100 also provides a process to guarantee sales prior to opening the alcoholic beverages, eliminating risk of spoilage and waste. System 100 also collects current and future consumer 116 selections, favorites, and wish list statistics data that can provide future service optimization. Each of these features and advantageous solves a unique problem that exists within the marketing and sale of alcoholic beverages from merchants to end consumers, and is extensible to fungible items that can be apportioned similarly.

Figure 2A:
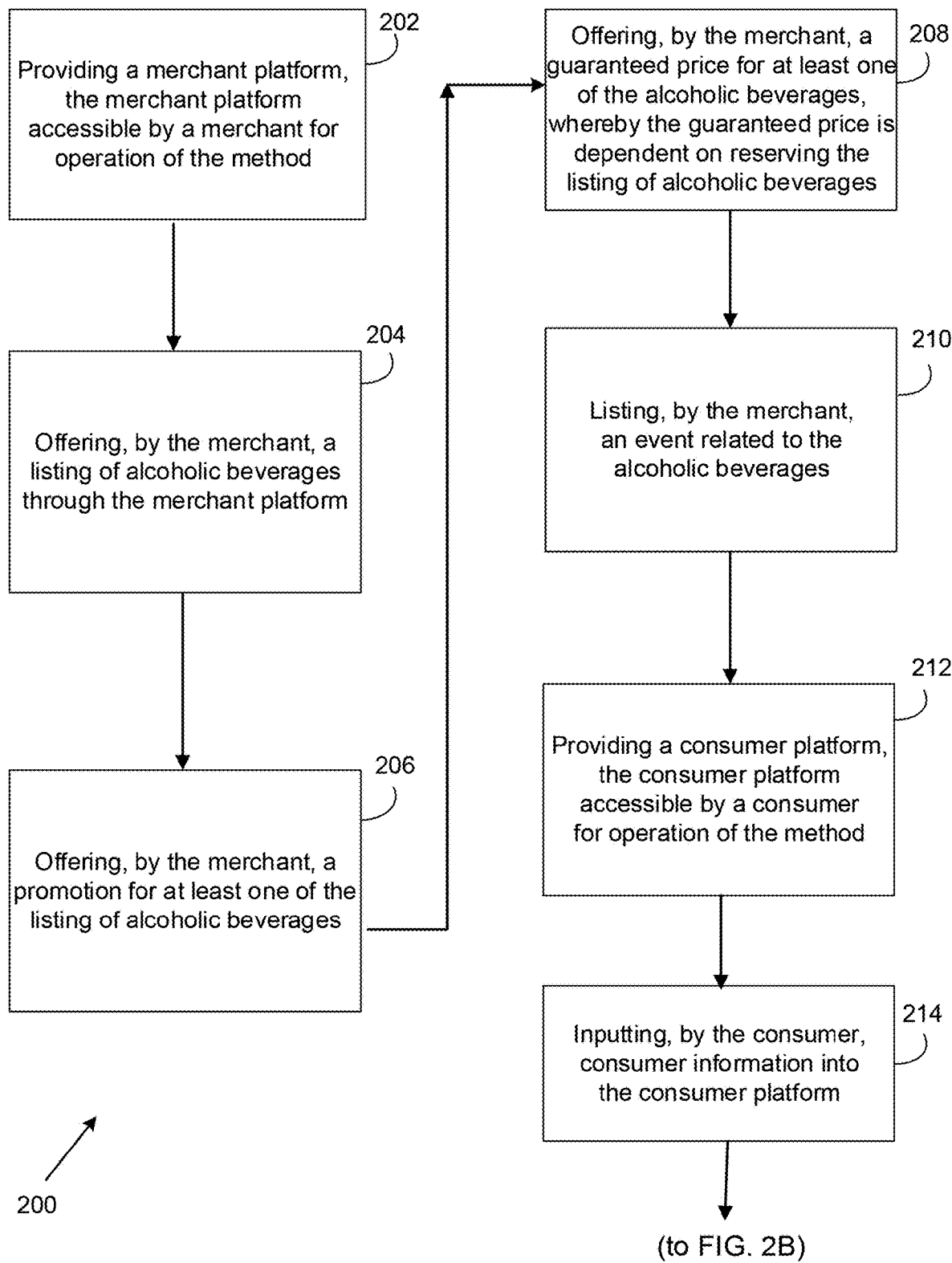
FIGS. 2A and 2B illustrate flowcharts of an exemplary method for enhancing alcoholic beverage transactions between a merchant and a consumer, in accordance with an embodiment of the present invention.
Figure 2B:
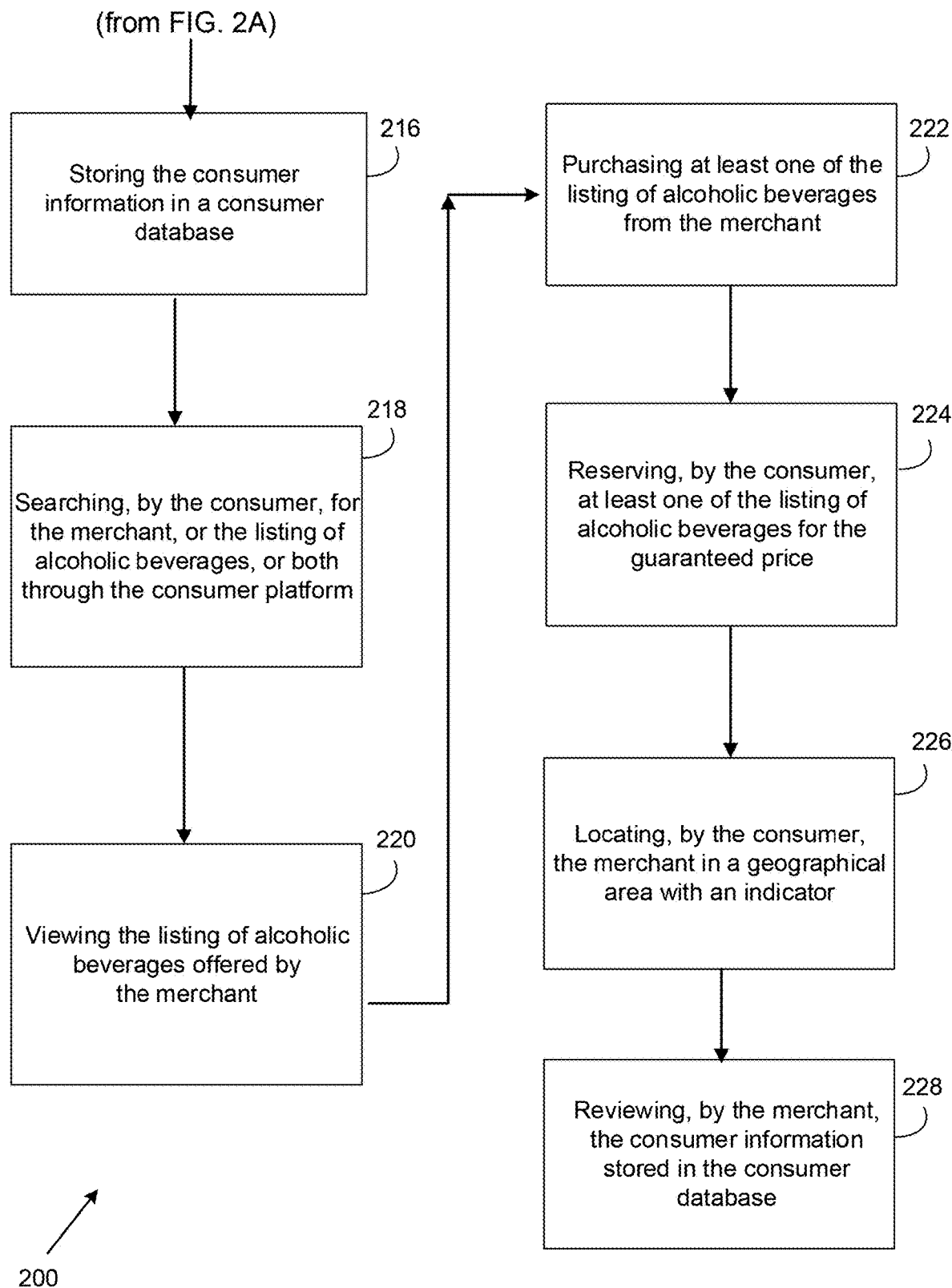

FIGS. 2A and 2B illustrate a flowchart of an exemplary method 200 for enhancing alcoholic beverage transactions between a merchant and a consumer. Method 200 may include an initial Step 202 of providing a merchant platform, the merchant platform accessible by a merchant for operation of the method. Method 200 enhances transactions of alcoholic beverages 130 by providing merchant platform 104, through which the merchant 130 can easily offer a listing 108a-c of alcoholic beverages, reserve a portion of or whole units of alcoholic beverages 130 for a consumer 116, schedule events 114, advertise promotions 110, and access a consumer database 124 having stored therein, a consumer information 122.

The method 200 may further comprise a Step 204 of offering, by the merchant, a listing of alcoholic beverages through the merchant platform. In some embodiments, the alcoholic beverage 130 may include, without limitation, wine, beer, liquor, champagne, spirits, tequila, rum, and specialty cocktail drinks. Alcoholic beverage 130 may be stored and dispensed from a vessel, such as a glass of wine, or a special type of wine in a wine bottle, beer bottle, shot glass, or wine decanter.

A Step 206 includes offering, by the merchant, a promotion for at least one of the listing of alcoholic beverages. Promotion 110 is offered by the merchant 130 to transact the listing of alcoholic beverages at an advantageous cost to consumer 116, or to attract new consumers 116 to the merchant 130, or to introduce a new type of alcoholic beverage.

In some embodiments, a Step 208 comprises offering, by the merchant, a guaranteed price for a portion of or a whole unit of at least one of the listing of alcoholic beverages, whereby the guaranteed price is dependent on reserving a portion of or the whole unit of at least one of the listing of alcoholic beverages. The reserved sale of the alcoholic beverage 130 allows the merchant 130 to guarantee a sale of the alcoholic beverage, and also allows the alcoholic beverage to be decanted or prepared for an optimal duration before the consumer 116 arrives to acquire the alcoholic beverage. Consumer 116 also benefits, knowing the alcoholic beverage will be available, and at a known price.

A Step 210 includes listing, by the merchant, an event related to the alcoholic beverages. In one embodiment, the event related to the alcoholic beverages is a wine tasting or food paring event. Though any type of alcoholic beverage event may be advertised by merchant on the consumer platform.

In some embodiments, a Step 212 may include providing a consumer platform, the consumer platform accessible by a consumer for operation of the method. System 100 also provides a consumer 116 with a consumer platform 118 to view the listings 108a-c of alcoholic beverages from merchant 130, find a merchant 130 in a geographical area 126, transact immediate purchases, reserve purchases of portions or whole units of select alcoholic beverages, and input consumer information 122 for storage in the consumer database 124. The subsequent alcoholic beverage transaction is easily performed on a downloadable or accessible software application from the convenience of a mobile communication device 106, 120 for each party in the transaction.

A Step 214 comprises inputting, by the consumer, consumer information into the consumer platform. In some embodiments, the consumer information may include, without limitation, a name, an alcoholic beverage preference, a purchase history, and a birthdate.

Another Step 216 includes storing the consumer information in a consumer database. Consumer information 122 is stored in a consumer database 124, whereby the merchant 130 has access to the consumer database 124 through the merchant platform 104.

Yet another Step 218 may include searching, by the consumer, for the merchant, or the listing of alcoholic beverages, or both through the consumer platform. Consumer may search a geographical area on the consumer mobile communication device to identify a location of a merchant or a desired alcoholic beverage.

In some embodiment, a Step 220 comprises viewing the listing of alcoholic beverages offered by the merchant. A Step 222 includes purchasing at least one of the listing of alcoholic beverages from the merchant. System 100 also allows a consumer 116 to purchase a portion of or a whole unit of at least one of the listings 108a-c of alcoholic beverages directly from the consumer platform 118. Payment is also afforded through payment means known in the art.

In some embodiments, a Step 224 may include reserving, by the consumer, at least a portion of or a whole unit of one of the listing of alcoholic beverages for the guaranteed price. In one embodiment, the guaranteed price is for a glass of wine.

A Step 226 includes locating, by the consumer, the merchant in a geographical area with an indicator. Method comprises an indicator that is operable to indicate a location of the merchant, or a type of the listing of alcoholic beverages, or both. Indicator 206 helps consumer differentiate between multiple merchants by their alcoholic beverage listings. In one embodiment, indicator 206 comprises variously colored pins that differentiate between the different types of merchants. For example, a red pin indicates a restaurant, while a blue pin indicates a liquor store.

A Step 228 comprises reviewing, by the merchant, the consumer information stored in the consumer database. Merchant 102 may use consumer information 122 to market to consumer, recommend alcoholic beverages, invite consumer to events 114, expand listings 108*a-c*, provide special promotions to consumer 116, and perform marketing activities known in the art.

In another embodiment, method further comprises a step of updating settings for the merchant through the merchant platform. Merchant may set up, on the merchant platform, at least one of the following parameters: User Information, Distance Settings, Social Networking, and Merchant Management. Similarly, method further comprises a step of updating settings for the consumer through the consumer platform. Consumer may set up, on the consumer platform, at least one of the following parameters: User Information, Distance Settings, Social Networking, and Merchant Management. This enables the merchant and consumer to manage and change preferences via their respective mobile communication devices.

In an alternative embodiment, system 100 and method 200 may be contained in various mediums ranging from mobile application based, personal computer, and Internet based. Variations of implementation is not limited to restaurants but can apply to any merchant customer relationship where there is a need to make known ones offerings and engage a group or individual of interested parties. System 100 and method 200 is extensible to multiple types of products where the apportioning of large quantity products into smaller, more affordable product portions is advantageous to the seller and consumer.

Figure 3:
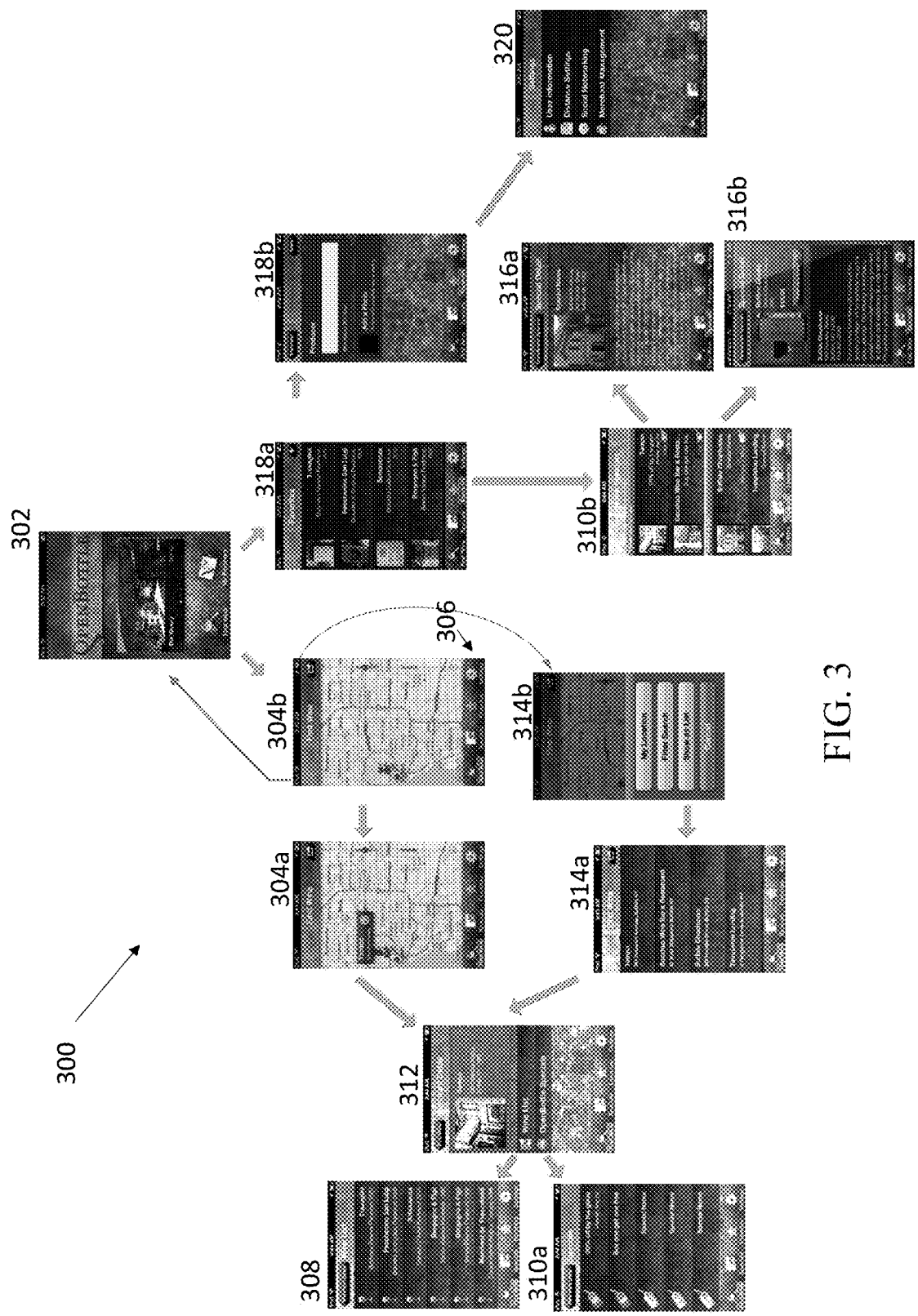
FIG. 3 illustrates mobile application screen shots of a system for transacting wine reservations and sales between a merchant and a consumer, in accordance with an embodiment of the present invention.

FIG. 3 references a mobile application screen shots of a system 300 for transacting wine reservations and sales between a merchant and a consumer. System 300 shows the process by which the wine is listed, located, reserved, and sold.

In one embodiment, a location based featured advertisement is referenced as 302. Location based advertisement 302 is configured to enable a consumer to identify a geographical location of a merchant who sells alcoholic beverages on a retail level. In some embodiments, location based featured advertisement may comprise a graphical depiction of a map with a given reference frame with respect to the merchant's regional location. The map may be overlaid with indicators that mark the location of participating merchants, i.e., restaurants, liquor store owners, or other alcohol related merchants.

At least one geographical listing for locations of restaurants is referenced as 304*a*, 304*b*. In some embodiments, the geographical listings 304*a-b* for locations of merchants, such as restaurants, can be viewed on a mobile application in an alternative view, as shown in 304*a-b*. In this view, participating merchants are displayed to consumers and vendors in listing form.

An indicator of the type and category of merchant and their listings of alcoholic beverages is referenced as 306. In some embodiments, indicator 306 is a visual cue that appears on the consumer platform. Indicator 306 helps consumer differentiate between multiple merchants by their alcoholic beverage listings. In one embodiment, indicator 306 comprises variously colored pins that differentiate between the different types of merchants. For example, a red pin indicates a restaurant, while a blue pin indicates a liquor store.

A regular listing of alcoholic beverages is referenced as 308. In this example, the merchant is a restaurant who is offering a regular listing 308 of alcoholic beverages. For example, various brands and years of wine bottles are listed along with their price. Though in other embodiments, the offerings of other merchants may be viewed. For a given merchant, the system 300 provides a detailed, compiled listing of what is being offered for sale or being made available to the consumer.

A special listing of unique alcoholic offerings is referenced as 310*a*, 310*b*. In some embodiments, special listings 310*a-b* of alcoholic beverages may be displayed similarly as regular listings 308, discussed above. Special listings 310*a-b* of alcoholic beverages may include rare vintages or older bottles of wine. Special listings 310*a-b* of alcoholic beverages may be priced at a premium. For a given restaurant or other merchant, a compiled special 310*a-b* listing of what offers are available but not typically available to the users.

A common user-select menu is referenced as 312. User-select menu 312 is a standard modular option set that assists the user to navigate the mobile application when operating system 300. Options provided with the user-select menu 312 may include, without limitation, wine list, open bottle specials, and discounted wines.

At least one alternative option box for displaying application data, including location means, is referenced as 314*a*, 314*b*. The dropbox 314*a* also displays: My Location, Filter Search, and Show as List. Dropbox 314*a* is used to present alternative option box 314*b*, which may include a listing of merchant restaurants and their respective addresses and contact information, which in this example shows: Tempo, Bacchus Wine Bar and Restaurant, Buffalo Chophouse, and Templeton Landing.

At least one detailed description of alcoholic beverage listings and pre-purchase option is referenced as 316*a*, 316*b*. Detailed description 316*a-b* of alcoholic beverage listings and pre-purchase options allows for a Guarantee of Sale. In this embodiment, consumer selects a desired special selection of alcoholic beverage, such as a glass of wine. Consumer may then lock in to the price to guarantee availability, price. This also benefits merchant by providing a guaranteeing the merchant a sale.

For example, detailed description 316*a* references a discounted glass of wine that reduces the normal price by 20%. Detailed description 316*b* references a meal special that pairs a glass of wine with one of a selection of meals for $15. In either case, the consumer locks into the deal and the merchant transacts a guaranteed sale.

At least one personalized box 318*a-b* provides a listing of consumer preferences. Personalized box 318*a-b* collects and displays the consumer's data from prior transactions or other data collection means known in the art. Personalized box 318*a* may include attributes for favorites, or a wish list. Similarly, personalized box 318*b* may provide a photograph of the consumer, and a space for consumer to inquire about the alcohol offerings. For example, "Who produces this wine?". These inquiries may be used to further enhance the data collected from the consumer.

An application set up process preference box is referenced as 320. Preference box 320 is a standard settings set up for a software application that operates on the mobile communication device of the consumer. In one embodiment, preference box 320 allows merchant or consumer to set up, on their respective platforms, at least one of the following parameters: User Information, Distance Settings, Social Networking, and Merchant Management. This enables the consumer to manage and change preferences via the mobile app.

Figure 4:
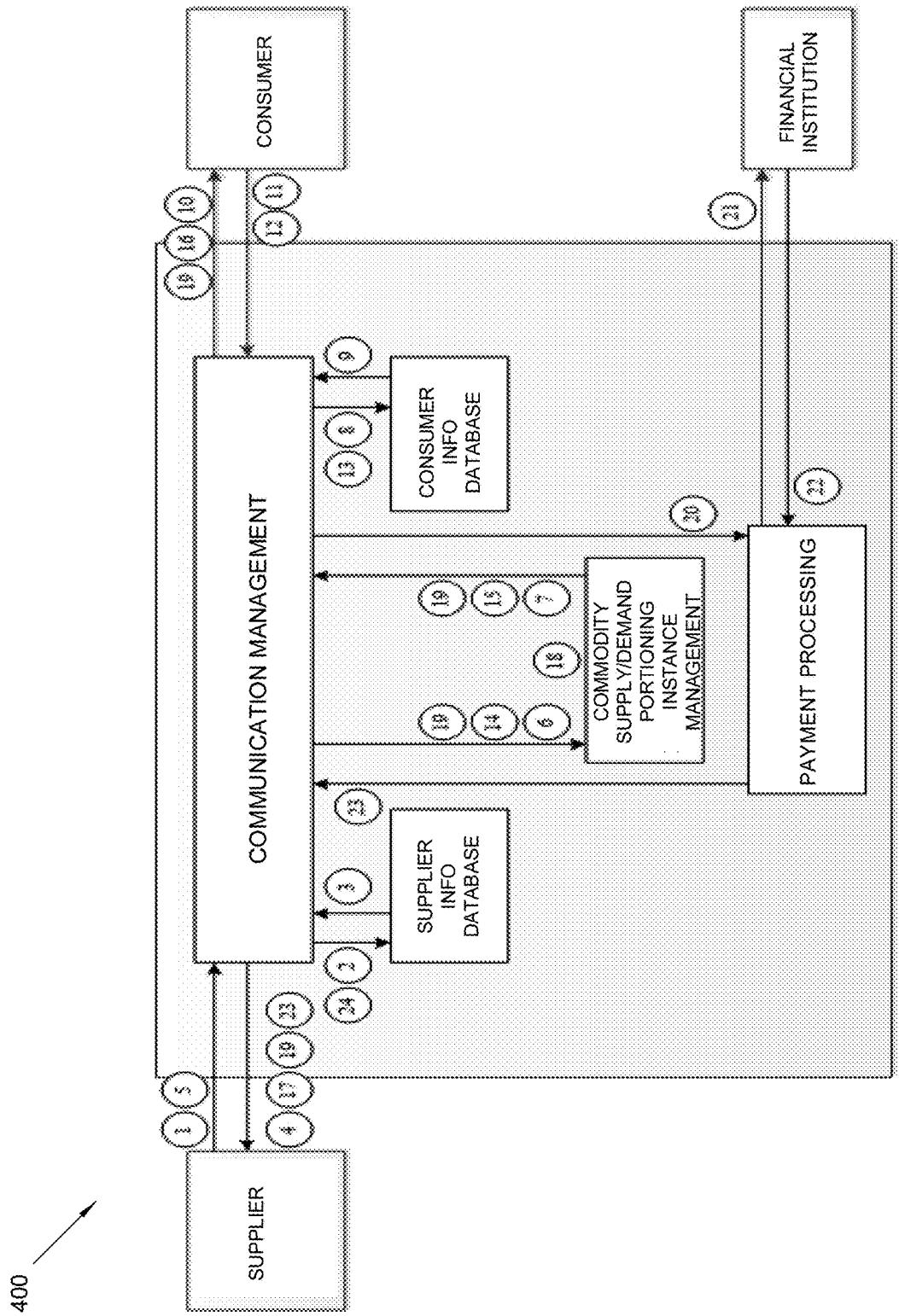
FIG. 4 illustrates a block diagram of a method for transacting portions of or whole alcoholic beverages, including storage of consumer information in a database and payment procedures, between a merchant and a consumer, in accordance with an embodiment of the present invention.

FIG. 4 references a block diagram of a method 400 for transacting alcoholic beverages, including storage of consumer information in a database and payment procedures, between a merchant and a consumer. In a first step of method 400, a Registered Merchant 1 initiates method by establishing a Portioning Event 2. A merchant's unique identifying credentials are checked for authenticity 3. Merchant's registered status is validated by the Invention 4. Merchant is permitted to initiate portioning Event and is prompted for necessary event attributes 5. Portioning Event attributes are passed to the Invention 6. The Invention processes the passed attributes and initiates Portioning Event based upon preset criteria 7. Next, the Portioning Event information is passed for Consumer Application Processing 8.

In another step, Consumer information, based on preferences, is merged to Portioning Event information and set for distribution 9. Merged Portioning Event package is distributed to Consumer by the Invention 10. Contact is made and the Consumer is prompted to respond to the offer contained within the Portioning Event details 11. Consumer accepts the portion(s) being offered and commits to the pre-sale of the portion-able commodity 12. Attributes of the acceptance are passed to the Invention 13. Consumer account information is updated with transaction details 14. Simultaneously, the Commodity Supply/Demand Portioning Instance Management function updates to reflect pre-sale of reserved portion 15.

A Guarantee of Sale is generated and is passed to the Consumer affirming the pre-sale of the desired portion 16. The Invention stores and makes available the Guarantee of Sale on the Consumers electronic device 17. Simultaneously the merchant is updated via the Invention's Merchant Dedicated Interface that an increment(s) of the portioned commodity has been pre-sold 18. Iterations of transactions between Consumers and the Invention continue until the Commodity Supply/Demand Portioning Instance Management function detects a threshold indicating completion of the Portioning Event has been achieved 19. Once met or not met a notification is generated and provided to the Merchant and Consumer that the Portioning Event threshold was or was not achieved 20.

If the Portioning Event threshold was achieved the Consumer is charged for the increment(s) of the portioned commodity that was pre-purchased 21. The charged value for the transaction obtained from the Consumer is transferred by the Invention to a Financial Institution until other transactions are required (refund, withdrawal, merchant payment, etc) 22. When required, the alternative method arranges and automatically facilitates the withdrawal of funds due to the merchant obtained for successful execution of the Portioning Event 23. Funds are routed to the merchant's destination of choice 24. The merchant's account information is updated with details of the transaction and the Portioning Event, which completes the transactional process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method for enhancing alcoholic beverage transactions and apportioning of products between a merchant and a consumer, the method comprising:

providing a merchant platform, the merchant platform accessible by the merchant for operation of the method;

offering, by the merchant, a listing of alcoholic beverages through the merchant platform;

offering, by the merchant, a promotion for a portion of at least one of the listing of alcoholic beverages;

offering, by the merchant, a guaranteed price for a portion of at least one of the listing of alcoholic beverages, whereby the guaranteed price is dependent on reserving a portion of at least one of the listing of alcoholic beverages;

listing, by the merchant, an event related to the alcoholic beverages;

providing a consumer platform, the consumer platform accessible by the consumer for operation of the method;

inputting, by the consumer, consumer information into the consumer platform;

storing the consumer information in a consumer database;

searching, by the consumer, for the merchant, or the listing of alcoholic beverages, or both through the consumer platform;

viewing the listing of alcoholic beverages offered by the merchant;

purchasing a portion of at least one of the listing of alcoholic beverages from the merchant;

reserving, by the consumer, a portion of at least one of the listing of alcoholic beverages for the guaranteed price;

locating, by the consumer, the merchant in a geographical area using a geographical location device with an indicator shown on a screen of a computing device;

at least one mobile application and at least one website for communication between the merchant and the consumer;

wherein the merchant platform and the consumer platform interface and communicate with the consumer database that stores consumer information, collecting and transmitting data to the merchant and the consumer;

the merchant platform being operable with a software application on at least one of a mobile communication device or other computing device;

at least two independent consumers;

reserving, by a first independent consumer, on a first communication device, a first portion of the contents of a designated, unopened bottle of an alcoholic beverage, the alcoholic beverage being a perishable good, which will be disaggregated and apportioned from other alcoholic beverage in the bottle during apportionment;

reserving, by a second independent user, on second communication device, a second portion of the contents of the designated bottle of alcoholic beverage;

holding, by the merchant, the reservations until the designated bottle of alcoholic beverage is fully reserved by the at least two independent consumers;

designating, with a communication device, a geographic location and a time for distributing the contents of the designated bottle of alcoholic beverage;

opening the designated bottle of alcoholic beverage;

apportioning the first portion of the bottle of alcoholic beverage to the first user at a first controlled volume;

apportioning the second portion of the bottle of alcoholic beverage to the second user at a second controlled volume;

apportioning to any additional users, the remaining reserved portions of alcoholic beverage in the designated bottle of alcoholic beverage; and reviewing, by the merchant, the consumer information stored in the consumer database.

2. The method of claim 1, wherein the alcoholic beverages include at least one of the following: wine, beer, liquor, champagne, spirits, tequila, rum, and specialty cocktail drinks.

3. The method of claim 1, wherein the merchant comprises a restaurant or a liquor store.

4. The method of claim 1, wherein the method comprises wherein the indicator is operable to indicate a location of the merchant, or a type of the listing of alcoholic beverages, or both.

5. The method of claim 1, wherein the guaranteed price is associated with a glass of wine.

6. The method of claim 1, wherein the event related to the alcoholic beverages is a wine tasting event.

7. The method of claim 1, wherein the consumer information includes at least one of the following: a name, an alcoholic beverage preference, a purchase history, and a birthdate.

8. The method of claim 1, further comprising a step of updating settings for the merchant platform.

9. The method of claim 1, further comprising a step of updating settings for the consumer platform.

10. The method of claim 1, wherein the indicator is operable to identify between the types of merchants and the listings of alcoholic beverages.

11. The method of claim 10, wherein the indicator is a colored pin visible on the geographical area.

* * * * *